(12) United States Patent
Cao et al.

(10) Patent No.: US 11,985,089 B2
(45) Date of Patent: May 14, 2024

(54) SOUNDING TO MIXED BANDWIDTH STATIONS

(71) Applicant: NXP USA, Inc., Austin, TX (US)

(72) Inventors: Rui Cao, Sunnyvale, CA (US); Sudhir Srinivasa, Los Gatos, CA (US); Xiayu Zheng, San Jose, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 168 days.

(21) Appl. No.: 17/495,367

(22) Filed: Oct. 6, 2021

(65) Prior Publication Data

US 2022/0116179 A1 Apr. 14, 2022

Related U.S. Application Data

(60) Provisional application No. 63/090,831, filed on Oct. 13, 2020.

(51) Int. Cl.
*H04L 5/00* (2006.01)
*H04B 7/06* (2006.01)

(52) U.S. Cl.
CPC ......... *H04L 5/0051* (2013.01); *H04B 7/0617* (2013.01); *H04B 7/0639* (2013.01); *H04L 5/001* (2013.01)

(58) Field of Classification Search
CPC ..... H04L 5/0051; H04L 5/001; H04L 5/0005; H04L 5/0094; H04B 7/0617; H04B 7/0639; H04B 7/0626; H04B 7/0695
See application file for complete search history.

(56) References Cited

U.S. PATENT DOCUMENTS

2016/0088646 A1* 3/2016 Sun .................. H04L 1/0028
370/329
2016/0301452 A1* 10/2016 Kwon .............. H04B 7/0634
(Continued)

FOREIGN PATENT DOCUMENTS

WO WO-2015065953 A1 * 5/2015 ............. H04L 5/003

OTHER PUBLICATIONS

IEEE P802.11ax™/D6.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Prepared by the 802.11 Working Group of the LAN/MAN Standards Committee of the IEEE Computer Society; Copyright ® 2019 by the IEEE.

(Continued)

*Primary Examiner* — Hardikkumar D Patel

(57) ABSTRACT

Various embodiments relate to a method of sounding a plurality of stations (STAs) with mixed operating bandwidths using a null data packet (NDP), wherein the bandwidth of the NDP is wider than the bandwidth of one STA, including: grouping STAs of mixed operating bandwidth in one sounding sequence by a beamformer; transmitting a null data packet announcement (NDPA) to the STAs, wherein the NDPA indicates the requested partial bandwidth channel feedback for each STA by the beamformer; transmitting the wide-bandwidth NDP to the STAs by the beamformer; transmitting beamforming report poll (BFRP) frame to the STAs to trigger uplink transmission of channel feedback reports by the beamformer; and receiving by the beamformer a partial bandwidth channel feedback within the STA's operating bandwidth from the STAs; receiving and parsing channel feedback reports from the STAs used for (Continued)

following steered OFDMA transmissions by the beamformer.

28 Claims, 2 Drawing Sheets

(56) References Cited

U.S. PATENT DOCUMENTS

| | | | | |
|---|---|---|---|---|
| 2016/0374081 | A1* | 12/2016 | Asterjadhi | H04W 72/0446 |
| 2018/0138959 | A1* | 5/2018 | Chun | H04B 7/06 |
| 2019/0349067 | A1* | 11/2019 | Huang | H04B 17/309 |
| 2020/0177425 | A1* | 6/2020 | Chen | H04L 27/2602 |
| 2022/0103295 | A1* | 3/2022 | Song | H04L 1/1819 |
| 2022/0240269 | A1* | 7/2022 | Minotani | H04W 72/121 |

OTHER PUBLICATIONS

Cao, Rui et al.; "EHT Beamformee NDP and Partial BW Feedback Support"; Doc.: IEEE 802.11-20/1807r0; Nov. 2020; 14 pages.

* cited by examiner

SOUNDING TO MIXED BANDWIDTH STATIONS

CROSS-REFERENCE TO RELATED APPLICATIONS

This application claims benefit to U.S. Provisional Patent Application Nos. 63/090,831 filed on Oct. 13, 2020, the contents of which are hereby incorporated by reference for all purposes as if fully set forth herein.

TECHNICAL FIELD

Various exemplary embodiments disclosed herein relate generally to apparatus and methods for extremely high throughput (EHT) sounding using null data packet (NDP) to mixed bandwidth stations.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of sounding a plurality of stations (STAs) with mixed operating bandwidths using a null data packet (NDP), wherein the bandwidth of the NDP is wider than the bandwidth of one STA, including: grouping STAs of mixed operating bandwidth in one sounding sequence by a beamformer; transmitting a null data packet announcement (NDPA) to the STAs, wherein the NDPA indicates the requested partial bandwidth channel feedback for each STA by the beamformer; transmitting the wide-bandwidth NDP to the STAs by the beamformer; transmitting beamforming report poll (BFRP) frame to the STAs to trigger uplink transmission of channel feedback reports by the beamformer; and receiving by the beamformer a partial bandwidth channel feedback within the STA's operating bandwidth from the STAs; receiving and parsing channel feedback reports from the STAs used for following steered OFDMA transmissions by the beamformer.

Various embodiments are described, wherein the STAs that are grouped in one sounding may be grouped in the following OFDMA data transmissions.

Various embodiments are described, wherein the STAs that are grouped in one sounding may park on secondary channels using subchannel selective transmission (SST) protocol.

Various embodiments are described, wherein the NDP is a variant of a non-orthogonal frequency division modulation access (OFDMA) PHY protocol data unit (PPDU).

Various embodiments are described, wherein the STAs that are grouped in one sounding with operating BW smaller than the sounding NDP are configured to process the wide-bandwidth NDP and generate the sounding feedback.

Various embodiments are described, wherein the channel feedback report includes compressed channel state information based on channel estimates of a non-OFDMA tone plan.

Various embodiments are described, wherein the channel feedback report for tones around DC in a 20 MHz station includes a feedback matrix that is interpolated.

Various embodiments are described, further including interpolating a feedback matrix for tones around DC in a 20 MHz station.

Various embodiments are described, wherein the channel feedback response for 20 MHz station pilot tones that are data tones in a 996RU tone plan include an estimate of a feedback matrix of the 20 MHz station pilot tones.

Various embodiments are described, further including extrapolating a feedback matrix for missing tones for a 20 MHz PPDU based upon 242RU tone plan feedback.

Various embodiments are described, wherein a second format of the NDP uses an orthogonal frequency division modulation access (OFDMA) tone plan for each 80 MHz segment.

Various embodiments are described, wherein NDPA is based upon the second format of the NDP when the bandwidth of the station is smaller than the bandwidth of the NDP.

Various embodiments are described, wherein use of the second format of the NDP is indicated by use of one entry in a PPDU and Compression Bits field in a U-SIG field.

Various embodiments are described, wherein use of the second format of the NDP is indicated when EHT-MCS=0 and Number of EHT-SIG symbols=1 or 2.

Various embodiments are described, wherein use of the second format of the NDP is indicated when PPDU and Compression Bits indicate an OFDMA mode and one special RU allocation entry in EHT-SIG is present.

Various embodiments are described, wherein use of the second format of the NDP is indicated when PPDU and Compression Bits" indicate an OFDMA mode and Nsymbol=0.

Further various embodiments relate to a device configured to sound a plurality of stations (STAs) with mixed operating bandwidth using a null data packet (NDP), wherein the bandwidth of the NDP is wider than the bandwidth of one the STAs, including: a transmitter; a receiver; a beamformer connected to the transmitter and the receiver configured to: group STAs of mixed operating bandwidth in one sounding sequence; transmit a null data packet announcement (NDPA) to the STAs, wherein the NDPA indicates the requested partial bandwidth channel feedback for each STA; transmit the wide-bandwidth NDP to the STAs; transmit beamforming report poll (BFRP) frame to the STAs to trigger uplink transmission of channel feedback reports; and receive and parse channel feedback reports from the STAs used for following steered OFDMA transmissions.

Various embodiments are described, wherein the STAs that are grouped in one sounding may be grouped in the following OFDMA data transmissions.

Various embodiments are described, wherein the STAs that are grouped in one sounding may park on secondary channels using subchannel selective transmission (SST) protocol.

Various embodiments are described, wherein the NDP is a variant of a non-orthogonal frequency division modulation access (OFDMA) PHY protocol data unit (PPDU).

Various embodiments are described, wherein the channel feedback report includes a compressed channel state information based on channel estimates of a non-OFDMA tone plan.

Various embodiments are described, wherein the channel feedback report for tones around DC in a 20 MHz station includes a feedback matrix that is interpolated.

Various embodiments are described, wherein the processor is further configured to interpolate a feedback matrix for tones around DC in a 20 MHz station.

Various embodiments are described, wherein the channel feedback response for 20 MHz station pilot tones that are data tones in a 996RU tone plan include an estimate of a feedback matrix of the 20 MHz station pilot tones.

Various embodiments are described, further including extrapolating a feedback matrix for missing tones for a 20 MHz PPDU based upon 242RU tone plan feedback.

Various embodiments are described, wherein the STAs that are grouped in one sounding with operating BW smaller than the sounding NDP are configured to process the wide-bandwidth NDP and generate the sounding feedback.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
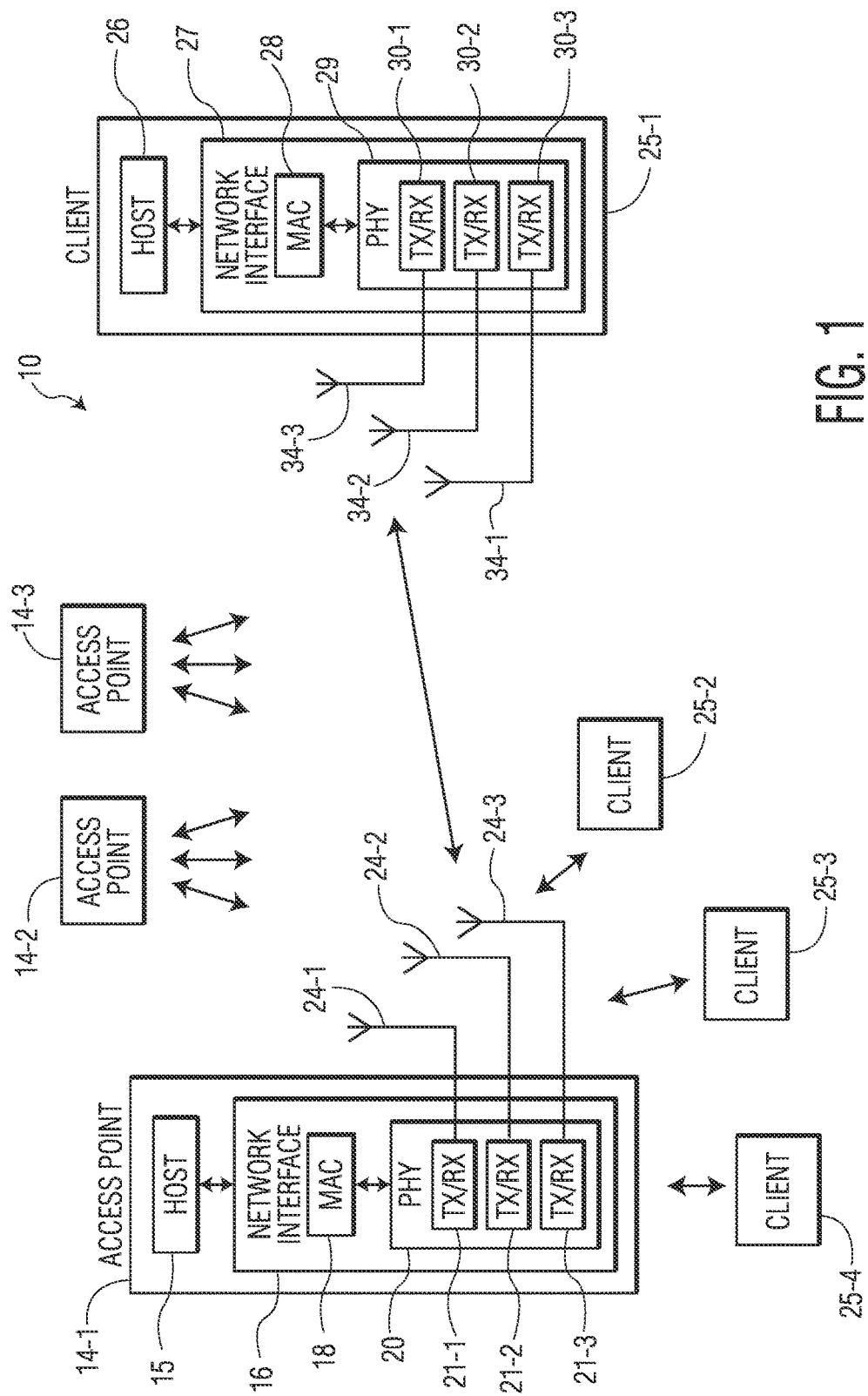
FIG. 1 is a block diagram of an example wireless local area network (WLAN), according to an embodiment.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one non-AP MLD includes multiple affiliated STAs. Two or more of the STAs of an non-AP MLD 25 are configured to receive corresponding data streams that are transmitted simultaneously by the AP 14. Additionally, two or more of the STAs of an non-AP MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of an non-AP MLD 25 may transmit data streams simultaneously to the multiple APs of an AP MLD 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an orthogonal frequency division multiple access (OFDMA) resource unit (RU) that includes the different OFDM RUs modulated in respective sub-channel blocks of the OFDMA RU. In an embodiment, the AP 14 allocates different sub-channels to different client stations and forms the OFDMA RU that includes OFDM RUs directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM RUs via different space time streams of a MU-MIMO communication channel to multiple users or full space time streams of a MIMO communication channel to a single user (SU). In an embodiment, the APs 14 allocates different sub-channels and space time streams to different client stations and forms the OFDM RUs and modulates the different OFDM RUs to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

In EHT, an AP may communication with various STAs having different bandwidths. Beamforming may be used with these various stations. Embodiments of how to perform null data packet (NDP) sounding will be described when the stations have various bandwidths and a wide bandwidth NDP is used for sounding wherein the bandwidth of the wide bandwidth NDP is greater than the bandwidth of some of the stations.

Starting with HE, OFDMA was defined to allow communication with multiple stations having various bandwidths, and with many users this provides many benefits by reducing the overhead required for a transmission to various stations individually. However, for a limited number of users and with dynamic packet lengths, OFDMA may not have benefits over multiple single-user transmissions, considering the traffic dynamics and extra control information that is required for the transmission. For one BSS with STAs that have a mix of operating bandwidths (BW), e.g. 20 MHz, 80 MHz, 160 MHz, or 320 MHz, a transmission to these various different BW STAs may beneficially be carried out using one wide-bandwidth OFDMA. For example, an OFMDA transmission to two 40 MHz STAs and one 80 MHz STA may be carried out using a 160 MHz OFMDA transmission. If the bandwidth required by the STAs is more than available in an OFMDA transmission, then the bandwidth used with each STA may be reduced as needed. Accordingly, each STA may be allocated RUs according to its device bandwidth. With sub-channel selective transmission (SST) enabled small-BW STAs, each small-BW STA can be allocated an RU size equal to its device BW on either primary or secondary sub-channels.

Beamforming may be used with OFDMA to further increase the performance of OFDMA due to increased beamforming gain. As a result, the modulation and coding scheme (MCS) may be enhanced or the range may be extended for each STA.

However, HE (i.e., 802.11ax) sounding protocol does not allow one sounding NDP to sound multiple STAs with mixed BWs, even though it allows the use of OFMDA to be used to communicate with multiple STAs having different bandwidths. As a result, each STA with a smaller bandwidth than OFDMA BW needs to be sounded one by one, which is less efficient and challenging to the AP that now needs to keep track of the sounding information for teach STA separately and then combine them together for the OFMDA transmission.

With the introduction of EHT (i.e., 802.11be), a wider bandwidth up to 320 MHz is available so that there may be potentially more diverse BW STAs in one BSS: e.g., 20 MHz, 80 MHz, 160 MHz, and 320 MHz STAs. Accordingly, in order to take advantage of the power of OFDMA, embodiments will be described herein including options for sounding to mixed BW STAs using one wide-band NDP.

First a recap of HE MU sounding protocol is provided. An HE trigger based (TB) sounding sequence is initiated by an HE beamformer with a broadcast HE NDP Announcement frame with two or more STA Info fields followed by an HE sounding NDP. Then a beamforming report poll (BFRP) trigger frame is transmitted. In response, each HE beamformee responses with an HE Compressed Beamforming/channel quality indicator (CQI) frame. The HE NDP uses the HE single user (SU) PHY Protocol Data Unit (PPDU) format, thus STAs that have as smaller BW than the NDP BW cannot be sounded in the NDP. Accordingly, only STAs having a BW greater than or equal to the NPD BW can be sounded in the NDP. Thus the beamformer cannot include the STAs with an operating BW smaller than the NDP in one NDPA, including STAs using the secondary channels based on the subchannel selective transmission (SST) protocol.

When SST is enabled, small bandwidth STAs may be allocated an RU size that is equal to its device bandwidth. On the other hand, HE does not require sounding for every RU and also defines partial BW feedback for one NDP sounding. The beamformer may request any set of continuous 26RUs to be feedback from each beamformee. However, because OFDMA has more benefits by multiplexing multiple smaller BW STAs on different frequency segments, OFDMA with beamforming/steering will need sounding to multiple smaller BW STAs or mixed BW STAs together in order to take advantage of decreased overhead resulting from OFMDA.

It is proposed to define sounding to mixed BW STAs using one wider BW NDP in EHT. An EHT MU trigger based (TB) sounding sequence to sound mixed BW STAs is initiated by an EHT beamformer with a broadcast EHT NDP Announcement frame with two or more STA Info fields followed by an EHT sounding NDP to the mixed BW STAs. Then a beamforming report poll (BFRP) trigger frame is transmitted to the mixed BW STAs. In response, each EHT beamformee responses with an EHT Compressed Beamforming/channel quality indicator (CQI) frame.

Figure 2:
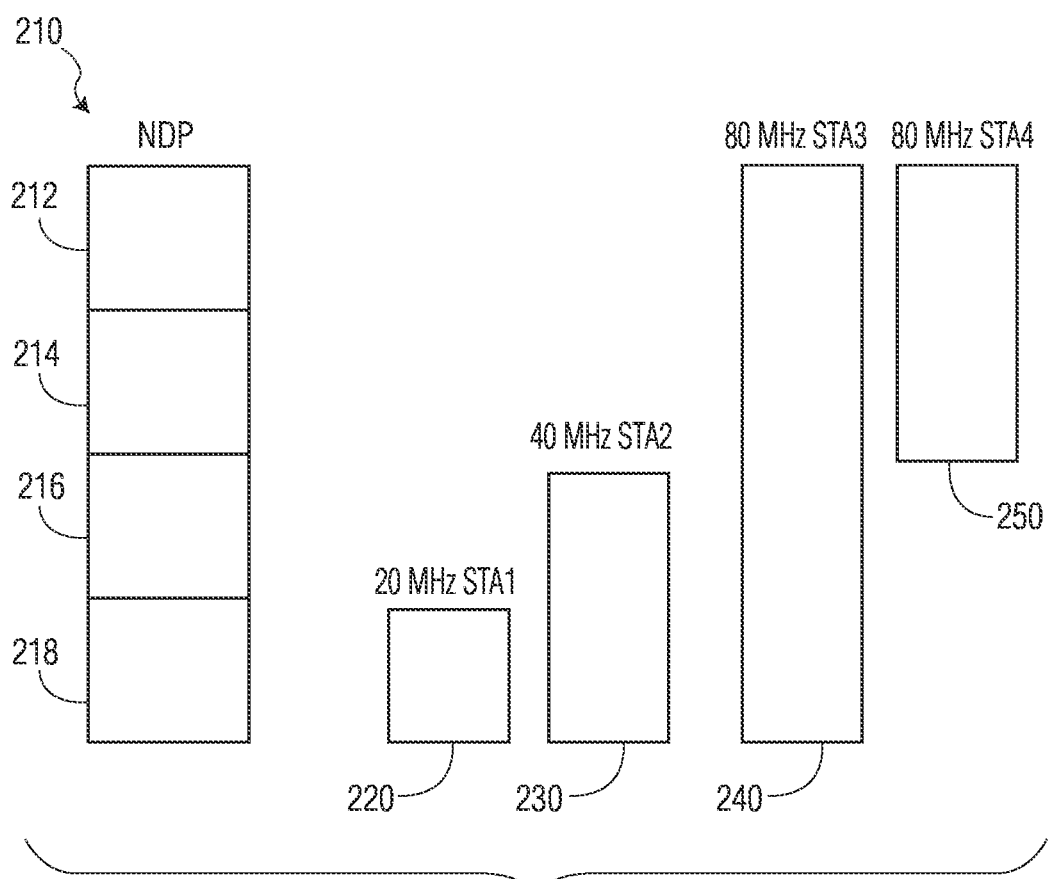
FIG. 2 illustrates an 80 MHz NDP that will provide sounding to four stations.

FIG. 2 illustrates an 80 MHz NDP 210 that will provide sounding to four mixed BW stations. The four stations include 20 MHz STA1, 40 MHz STA2, 80 MHz STA3, and 80 MHz STA4. The NDP 200 has four 20 MHz sections 212, 214, 216, and 218. The NDP 210 may be used to sound the four stations in one transmission. The NDP 210 solicits sounding feedback on various portions of the 80 MHz bandwidth as shown in FIG. 2. STA1 provides sounding feedback 220 on the lowest 20 MHz. STA2 provides sounding feedback 230 on the lowest 40 MHz. STA3 provides sounding feedback 240 on the whole 80 MHz BW. STA4 provides sounding feedback 250 on the highest 40 MHz. More specifically, feedback 220 is constructed based on the feedback tone set of 242RU1. The feedback 230 is constructed based on the feedback tone set of 484RU1. the feedback 240 is constructed based on the feedback tone set of 996RU. The feedback 250 is constructed based on the feedback tone set of 484RU2. FIG. 2 provides an example of an 80 MHz NDP, but the same approach may be used for a 160 MHz NDP or a 320 MHz NDP. In addition, the smaller BW SST STAs parked on the secondary channels may also be included in the wide bandwidth sounding and receive a wide bandwidth NDP.

The beamformer will indicate the solicited partial bandwidth feedback information for each of the STAs in in the NDPA frame prior the NDP transmission. For example, the AP solicited the lowest 40 MHz for STA2 and the highest 40 MHz for STA 4 even though STA4 has a bandwidth of 80 MHz. Accordingly, the AP can then transmit to STA2 and STA4 in one OFDMA transmission with each STA being allocated a 484-tone RU and perform beamforming on each RU. For example, in systems prior to EHT, the 20 MHz operating STA1 or the 40 MHz operating STA2 would not process the received 80 MHz NDP 210 and not respond with compressed beamforming feedback. As a result, 20 MHz and 40 MHz operating STAs need to understand the NDPA partial BW feedback request based on 80 MHz NDP BW, and process the 80 MHz NDP 210 and return a corresponding partial BW feedback report.

Two different design options for new wide-bandwidth sounding NDP to multiple BW STAs will now be described.

In a first NDP option, the NDP is defined based on OFDMA tone plan. This will be a new NDP format to be used to sound multiple STAs in addition to the sounding NDP using a non-OFDMA format similar to the HE sounding NDP format defined in 802.11ax. So this first NDP option results in two NDP formats: an non-OFDMA format and an OFMDA format. So when the beamformer schedules multiple STAs of the same BW in one MU sounding, then the non-OFDMA format NDP will be used for sounding. When the beamformer schedules multiple STAs of mixed operating BWs and the NDP BW is wider than one or more STAs' operating BW, then the OFMDA format NDP will be used for sounding. When receiving an OFDMA NDP, a beamformee will compute the partial BW feedback based on the OFDMA tone plan. The processing of the EHT-LTF in NDP is similar to the following OFDMA data packet reception, so no extra handling is needed at the beamformee side. Accordingly, the beamformer and beamformee needs to support two NDP formats.

In a second NDP option, only one NDP format is defined using non-OFDMA format. With this option, the beamformee with a smaller BW than NDP BW will require more effort to compute the sounding feedback than processing an NDP of BW within beamformee's operating BW. As partial BW feedback tone set is defined based on the OFDMA tone plan, if the NDP BW is larger than STA's operating BW, the beamformee will compute the feedback report from non-OFDMA NDP.

Implementations of the first and second NDP options will now be described. For the first NDP option there are two NDP formats that need to be defined: the non-OFDMA format and OFDMA format. The non-OFDMA format is similar to the one defined in the 802.11n/ac/ax specifications by reusing the EHT PPDU format for single user, but with zero data symbols, i.e., only the preamble portion is used. This same format will be used in the first NDP option.

The OFDMA NDP can be similarly defined as an variant of EHT-Multi-user (MU) PPDU. The EHT-LTF (EHT-long training field) will use the 484+484 OFDMA tone plan for each non-punctured 80 MHz segment, so there are 16+16 pilots. This is the same as the 242+242+242+242 tone plan. This allows for flexibility as for each 20 MHz BW with its 242RU tone plan. In a punctured 80 MHz BW, the same tone plan as OFDMA transmission is used.

Four examples of signaling of EHT OFDMA NDP in the preamble portion will now be described. In a first example, one entry in the PPDU type and Compression Bits sub-field in the U-SIG field that is not being used may be used to indicate the EHT NDP is using OFDMA format. In a second example, a combination of EHT-MCS=0 and Number of EHT-SIG symbols=1 or 2 in the U-SIG field may be used to indicate the EHT NDP format. In a third example, the PPDU and Compression Bits and one RU allocation entry is used to indicate the OFDMA mode. Finally, in a fourth example, the same entry in PPDU and Compression Bits indicating EHT MU PPDU is used and the receiver will use the computed Nsymbol equal to 0 as the indication that the received packet is an EHT OFDM NDP.

For option one, the beamformer needs to support transmission of the new 484+484 tone plan in a non-punctured 80 MHz segment. A beamformee STA operating at 20 MHz and 40 MHz will process the OFDMA NDP similarly as receiving a wideband OFDMA. A beamformee STA operating at 80 MHz or wider BW will need to compute the beamforming feedback on the new pilot tones plan for each non-punctured 80 MHz, i.e., interpolate the BF feedback on the new pilot tones.

For the second NDP option the beamformer sends out the NDP in a non-OFDMA format. This means that there is no change to the beamformer. For a beamformee with an operating BW>NDP BW, the NDP will be processed as a normal sounding packet. A beamformee with a smaller operating BW than the NDP BW will need to compute partial BW channel information based on wider bandwidth non-OFDMA NDP tone plan and provide that feedback indicated in the NDPA.

A beamformee included in the NDPA frame needs to process the NDP and generate the beamforming report according to the requirements specified in the NDPA. The NDP processing may include computing the compressed channel state information (CSI) and/or CQI on the requested partial BW. A 20 MHz operating BW STA will need to process the partial BW CSI and/or CQI feedback based on 242RU in the 40 MHz, 80 MHz or wider BW NDP. Due to the misalignment of 242-tone RU in wider BW OFDMA and the 242-tone RU in 20 MHz PPDU, some feedback tones may be missing or not transmitted as compared to 20 MHz tone plan. The 20 MHz beamformee needs to handle the feedback around DC tones. The wide BW beamformer may reuse the partial BW 242-tone BF feedback to steer the 20 MHz PPDU, and the steering matrix for missing some edge tones needs to be computed by either extrapolating or copying from adjacent feedback tones. Further, the beamformer needs to handle the use of both a punctured 80 MHz segment or a non-punctured 80 MHz segment.

A 40 MHz operating BW STA will need to feed back 242RU or 484RU for an 80 MHz or wider BW NDP. The BW feedback index of 484RU may be used. Further, the beamformer needs to handle the use of both a punctured 80 MHz segment or a non-punctured 80 MHz segment.

For STAs with an operating BW of 80 MHz or higher, the beamforming processing may be done based on the same tone plan as used by the wider the BW OFDMA. This processing will handle either punctured or non-punctured 80 MHz BW.

The non-OFDMA EHT NDP signaling will now be described. First, there are two examples of non-OFDMA EHT NDP signaling. In a first example, one entry in PPDU format and compression mode is used to indicate a non-OFDMA EHT NDP. In a second example, the same signaling as the non-OFDMA compressed mode and Nsymbol=0 is used and there is no data in the packet. The MCS may be set to a specific value.

Because the EHT NDP may be operating with puncturing, puncturing information needs to be specified in the EHT NDP. In a first example, the existing 5-6 bit table defined for non-OFDMA is used. A second option is to use an additional 4-bit bitmap to indicate puncturing for the EHT NDP.

Now a few examples the processing done by STAs that have an operating BW less than the BW of the EHT NDP are provided to illustrate how differences in the tone plans may be addressed.

The first example is of a 20 MHz STA processing a 40 MHz NDP. To cover the 20 MHz bandwidth a 242RU tone plan is used. The 242RU tone plan for a 20 MHz station is as follows:
[−128:−123] [−122:−117] [−116: −2] [−1:1] [2:122] [123: 125][126:127]

The 40 MHz tone plan includes two 242RUs that are a shifted and compressed tone plan as compared to the 20 MHz tone plan. The left 242RU tone plan for the lower 20 MHz in 40 MHz tone plan is as follows:
[−256:−251] [−250:−245] [−244:−130] [−129:−127] [−126: −4] [−5: −3][−2: −1]

It is noted that in the 20 MHz STA tone plan that the DC tones are in the middle of the tone plan and the loaded tones are −122 to −2 and 2 to 122. In the left 242RU tone plan: the tones −244 to −130 and −126 to −4 are loaded; tones −129 to −127 overlap with the 20 MHz DC tones; tones −250 to −245 are unloaded, while the corresponding tones in the 20 MHz plan are loaded; and the tones −5 to −3 are unloaded. Compared to the 20 MHz feedback tone set, one tone is on DC, and needs special processing. The 40 MHz OFDMA tone plan includes 8 pilots in each 242RU.

Feedback tones need to be addressed. The beamformer may use the same feedback tone set for each 242RU as defined in the 40 MHz NDP feedback index set. Then the beamformee then follows the OFDMA feedback tone set. For feedback indices that lie in the DC tones of the 20 MHz only STA, the STA can feedback the tone using one of the following three examples. In a first example, the beamformee interpolates feedback matrix from neighboring tones and provides the interpolated tones as feedback. In a second example, the beamformee will feedback any value implemented by the STA, and the beamformer will interpolate these values. In a third example, the beamformer and beamformee will skip the tones in the feedback. Then the beamformer may reuse this feedback to steer the potential 20 MHz transmission to the STA and will need to compute a steering matrix for tones −250 to −245 (−122 to −117 in the 20 MHz tone plan).

The second example is of a 20 MHz STA processing a 80 MHz NDP. To cover the 20 MHz bandwidth a 242RU tone plan is used. The 242RU tone plan for a 20 MHz station is as follows:
[−128:−123] [−122:−117] [−116:−2] [−1:1] [2:122] [123:125] [126:127]

The 80 MHz tone plan includes four 242RUs that are a shifted and compressed tone plan as compared to the 20 MHz tone plan. The leftmost 242RU tone plan for the lower 20 MHz in 40 MHz tone plan is as follows:
[−512:−507] [−506:−501] [−500:−386] [−385:−383] [−382:−262] [−261:−259] [−258:−257]

It is noted that in the 20 MHz STA tone plan that the DC tones are in the middle of the tone plan and the loaded tones are −122 to −2 and 2 to 122. In the leftmost 242RU tone plan: the tones −500 to −286 and −382 to −262 are loaded; the tones −129 to −127 overlap with the 20 MHz DC tones; tones −506 to −501 are unloaded, while the corresponding tones in the 20 MHz plan are loaded; and the tones −261 to −259 are unloaded. Compared to 20 MHz feedback tone set, one tone is on DC, and needs special processing. The 40 MHz OFDMA tone plan includes 8 pilots in each 242RU. The non-punctured 80 MHz segment 242RU tone plan is similar to that of the OFDMA tone plan, but pilots are based on 996 RU pilots (4 pilots). The punctured 80 MHz 242RU tone plan is the same as OFDMA with 8 pilots.

Feedback tones need to be addressed using two different options. In a first option, the same feedback tone set defined for each 242 in 80 MHz NDP feedback index set is used. For the punctured 80 MHz tone plan, the beamformee processes the same tones as in OFDMA, and the feedback is based on the 242RU tone plan. For the non-punctured 80 MHz tone plan, the beamformee needs to process channel based on 4 pilot tones. Two different approaches may be used to accomplish this. The first approach estimates the channel on 4 extra data tones and uses them for feedback. The second approach skips channel estimation of these tones by treating them as pilot tones and interpolates them if it is the feedback tone. For DC tones, the same processing options may be used as described above for the 40 MHz NDP.

In the second option, the beamformee may use a new feedback tone plan based on the 242RU and available pilot tones.

The third example is of a 40 MHz STA processing a ≥80 MHz NDP. To cover the 40 MHz bandwidth a 484RU tone plan is used. The 484RU tone plan for a 40 MHz station is as follows:
[−256:−251] [−250:−245] [−244:−130] [−129:−127] [−126:−3] [−2:−1]

The 80 MHz tone plan includes two 484RUs. The left 484RU tone plan for the lower 40 MHz in 80 MHz tone plan is as follows:
[−512:−507] [−506:−501] [−500:−259] [−258:−252] [−253:−12] [−11:−1]

It is noted that in the 40 MHz STA tone plan aligns with the left 484RU tone plan for the 80 MHz NDP including the loaded tones. For the non-punctured 80 MHz segment, the 484RU tone plan based on a 996 RU tone plan has less pilots (8 pilots out of 16 pilots). For the punctured 80 MHz segment, the 484RU tone plan is the same as 80 MHz OFDMA tone plan with 16 pilots.

Feedback tones need to be addressed. The same feedback tone set defined for each 484RU tone plan in the 80 MHz NDP feedback index set is used. For a punctured 80 MHz tone plan, the beamformee processes the 80 MHz NDP the same as OFDMA, and the feedback is based on the 484RU tone plan. For a non-punctured 80 MHz tone plan, the beamformee needs to process the channel based on 8 pilot tones. Two different approaches may be used. In a first approach, the beamformee estimates the channel on 8 extra data tones and uses them for feedback. In a second approach, the beamformee skips channel estimation of these tones by treating them as pilot tones and interpolates them if it is the feedback tone.

The fourth example is of a 80 MHz STA processing a ≥80 MHz NDP. Any wider BW tone plan is based on the 80 MHz tone plan, including both non-punctured 80 MHz segments and punctured 80 MHz segments. The same feedback tone set defined for each 80 MHz segment feedback index set is used. The beamformee processes the ≥80 MHz NDP similarly as wide bandwidth OFDMA.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of sounding a plurality of stations (STAs) comprising:
   grouping the STAs into a beamforming sounding sequence using a beamformer;
   transmitting a null data packet announcement (NDPA) to the STAs,
   wherein the NDPA indicates a requested partial bandwidth channel feedback beamforming report for each STA in response to a null data packet (NDP);
   transmitting the NDP in an orthogonal frequency division modulation access (OFDMA) format to the STAs by the beamformer;
   transmitting a beamforming report poll (BFRP) frame to the STAs to trigger uplink transmission of the requested channel feedback beamforming reports; and
   receiving and parsing the requested channel feedback beamforming reports from the STAs;
   wherein a bandwidth of the NDP is greater than an operating bandwidth of at least one of the STAs and is less than an operating bandwidth of at least another one of the STAs.

2. The method of claim 1,
   wherein the STAs that are grouped in the one sounding sequence are also grouped for OFDMA data transmissions.

3. The method of claim 1,
   wherein the STAs that are grouped in the one sounding sequence may park on secondary channels using a subchannel selective transmission (SST) protocol.

4. The method of claim 1,
   wherein the NDP is a variant of a non-OFDMA PHY protocol data unit (PPDU).

5. The method of claim 1,
   wherein the STAs that are grouped in the one sounding sequence and having an operating BW less than the bandwidth of the NDP are configured to process the NDP and generate the requested partial bandwidth channel feedback beamforming report.

6. The method of claim 1,
   wherein the requested partial bandwidth channel feedback beamforming report includes compressed channel state information based on channel estimates of a non-OFDMA tone plan.

7. The method of claim 1,
   wherein the requested partial bandwidth channel feedback beamforming report for tones around DC in a 20 MHz station includes a feedback matrix that is interpolated.

8. The method of claim 1, further comprising
   interpolating a feedback matrix for tones around DC in a 20 MHz station.

9. The method of claim 1,
   wherein the requested partial bandwidth channel feedback beamforming report for 20 MHz station pilot tones that are data tones in a 996RU tone plan include an estimate of a feedback matrix of the 20 MHz station pilot tones.

10. The method of claim 1, further comprising
    extrapolating a feedback matrix for missing tones for a 20 MHz PPDU based upon 242RU tone plan feedback.

11. The method of claim 1,
    wherein a variant of the NDP uses an OFDMA tone plan for each 80 MHz segment.

12. The method of claim 11,
    wherein the NDPA indicates the variant of the NDP when the operating bandwidth of the at least one of the STAs is less than the bandwidth of the NDP.

13. The method of claim 11,
    wherein use of the variant of the NDP is indicated by use of one entry in a PPDU and Compression Bits field in a U-SIG field.

14. The method of claim 11,
    wherein use of the variant of the NDP is indicated when EHT-MCS=0 and Number of EHT-SIG symbols=1 or 2.

15. The method of claim 11,
    wherein use of the variant of the NDP is indicated when PPDU and Compression Bits indicate an OFDMA mode and one special RU allocation entry in EHT-SIG is present.

16. The method of claim 11,
    wherein use of the variant of the NDP is indicated when PPDU and Compression Bits" indicate an OFDMA mode and Nsymbol=0.

17. A device configured to sound a plurality of stations (STAs), comprising:
    a transmitter;
    a receiver;
    a beamformer coupled to the transmitter and the receiver and configured to:
    group the STAs into a beamforming sounding sequence;
    transmit a null data packet announcement (NDPA) to the STAs,
    wherein the NDPA indicates a requested partial bandwidth channel feedback beamforming report for each STA in response to a null data packet (NDP);
    transmit the NDP in an orthogonal frequency division modulation access (OFDMA) format to the STAs;
    transmit a beamforming report poll (BFRP) frame to the STAs to trigger uplink transmission of the requested channel feedback beamforming reports; and
    receive and parse the requested channel feedback beamforming reports from the STAs;
    wherein a bandwidth of the NDP is greater than an operating bandwidth of at least one of the STAs and is less than an operating bandwidth of at least another one of the STAs.

18. The device of claim 17,
    wherein the STAs that are grouped in the one sounding sequence are also grouped for OFDMA data transmissions.

19. The device of claim 17,
    wherein the STAs that are grouped in the one sounding sequence may park on secondary channels using a subchannel selective transmission (SST) protocol.

20. The device of claim 17,
    wherein the NDP is a variant of a non-OFDMA PHY protocol data unit (PPDU).

21. The device of claim 17,
    wherein the requested partial bandwidth channel feedback beamforming report includes compressed channel state information based on channel estimates of a non-OFDMA tone plan.

22. The device of claim 17,
    wherein the requested partial bandwidth channel feedback beamforming report for tones around DC in a 20 MHz station includes a feedback matrix that is interpolated.

23. The device of claim 17,
    wherein the beamformer is further configured to interpolate a feedback matrix for tones around DC in a 20 MHz station.

24. The device of claim 17,
wherein the requested partial bandwidth channel feedback beamforming report for 20 MHz station pilot tones that are data tones in a 996RU tone plan include an estimate of a feedback matrix of the 20 MHz station pilot tones.

25. The device of claim 17, further comprising
extrapolating a feedback matrix for missing tones for a 20 MHz PPDU based upon 242RU tone plan feedback.

26. The device of claim 17,
wherein the STAs that are grouped in the one sounding sequence and having an operating BW less than the bandwidth of the NDP are configured to process the NDP and generate the requested partial bandwidth channel feedback beamforming report.

27. The device of claim 17:
wherein the plurality of stations (STAs) are all part of a same BSS (Basic Service Set).

28. The device of claim 17:
further comprising grouping all of the STAs into a single beamforming sounding;
wherein the requested partial bandwidth channel feedback beamforming report for each STA is in response to a single null data packet (NDP).

* * * * *